W. P. REIBOLDT & E. C. CLARK.
CHAIN GRATE STOKER.
APPLICATION FILED SEPT. 20, 1911.

1,173,307.

Patented Feb. 29, 1916.
8 SHEETS—SHEET 1.

WITNESSES
Cornelius Zabriskie
F. E. Blodgett.

INVENTORS:
William P. Reiboldt,
Edward C. Clark,
BY Russell M. Everett,
ATTORNEY.

W. P. REIBOLDT & E. C. CLARK.
CHAIN GRATE STOKER.
APPLICATION FILED SEPT. 20, 1911.

1,173,307.

Patented Feb. 29, 1916.
8 SHEETS—SHEET 3.

WITNESSES
Cornelius Zabriskie
F. E. Blodgett INVENTORS:
William P. Reiboldt
Edward C. Clark,
BY
Russell M. Everett,
ATTORNEY.

W. P. REIBOLDT & E. C. CLARK.
CHAIN GRATE STOKER.
APPLICATION FILED SEPT. 20, 1911.

1,173,307.

Patented Feb. 29, 1916.
8 SHEETS—SHEET 8.

WITNESSES
Cornelius Gabrielski
F. E. Blodgett.

INVENTORS:
William P. Reiboldt,
Edward C. Clark,
BY
Russell M. Everett,
ATTORNEY.

UNITED STATES PATENT OFFICE.

WILLIAM P. REIBOLDT, OF NEWARK, AND EDWARD C. CLARK, OF NUTLEY, NEW JERSEY, ASSIGNORS TO OSCAR BARNETT FOUNDRY COMPANY, A CORPORATION OF NEW JERSEY.

CHAIN-GRATE STOKER.

1,173,307.  Specification of Letters Patent.  Patented Feb. 29, 1916.

Application filed September 20, 1911. Serial No. 650,459.

*To all whom it may concern:*

Be it known that we, WILLIAM P. REIBOLDT, a citizen of the United States, residing at Newark, in the county of Essex and State of New Jersey, and EDWARD C. CLARK, a citizen of the United States, residing at Nutley, in the county of Essex and State of New Jersey, have invented certain Improvements in Chain-Grate Stokers, of which the following is a specification.

The objects of this invention are to provide a chain grate stoker which can be depended upon to act positively and continuously without getting out of order and to obtain the greatest boiler efficiency; to secure an improved feed control to regulate the quantity of fuel fed from the supply hopper onto the grate; to provide improved means for preventing combustion being communicated to the fuel in the hopper; to provide an improved drive for the stoker which shall impart to it a steady uniform movement; to enable the said driving means to be mounted so that it shall retain a fixed relation to the driven parts regardless of adjustment of said parts to tighten the chain grate; to enable different driving means, as engines, electric motors and the like, to be interchangeably applied to the mountings to drive the stoker; to reduce the sifting of fine particles of fuel through the front part of the chain grate as it is fed onto said grate; to safeguard against breakage and falling out of grate bars at inaccessible points, by providing means for retaining such bars in normal position until they reach the front of the stoker where they can be removed and replaced; to provide bridge bars at the rear end of the grate which will not burn out or weld together; to protect said bridge bars by fire-brick, and to secure a construction of bridge-bar adapted to receive such fire-brick; to employ an improved attachment of the grate bars to the chains, and to obtain other advantages and results as may be brought out in the following description.

Referring to the accompanying drawings, in which like numerals of reference indicate the same parts throughout the several figures.

In said drawings, 1 indicates a boiler of any usual type set or mounted in brick work 2 with side stays 3 and tie-rods 4 as is common. The front end of said boiler is supported upon an arch 5 in front of which is the front plate 6 of the boiler, and beneath said arch and boiler is the usual furnace chamber 7 preferably having peep-holes 8, 8 in its sides. The stoker extends inward through said front plate into the furnace chamber 7 to the bridge wall 9 and provides beneath itself an ash pit 10.

At its front the stoker has opposite parallel housings 11, 11 projecting from the front plate 6 of the boiler and extending vertically upward from the floor. The front shaft 12 of the chain grate is mounted on the upper edges of said housings 11, and the chain grate extends horizontally rearward therefrom, being supported by upper and lower rails 13, 14 at each side of itself which extend from said housings to the bridge wall 9. Above said shaft 12 and the front end of the chain grate traveling therearound, is the fuel-feeding means which will next be described.

A hopper is formed by arranging endwise between the end plates 28, 28 which project from the front plate 6 vertically above the housings 11, 11, a hopper plate 15 which slopes rearwardly downwardly to the upper surface of the chain grate, meeting the same at a little distance in front of the plane of the front plate 6, so that a transverse strip of the grate forms the bottom of the hopper. The front plate 6 of the boiler forms the back of the hopper and is of course cut away at its lower part to provide a space or opening for the fuel to be carried inward by the traveling grate. The height of this space controls the depth of fuel fed upon the chain grate and a vertically adjustable gate is provided upon the front plate to project beyond its lower edge and enable a greater or less depth of coal to be fed. This gate, comprises a hollow plate-like body 16 adapted to extend between the end plates 28, 28 of the stoker and being held in flatwise relation to the front plate 6 by the overlapping flange 17 of a guard 18 which is bolted by its upper flange 19 to the front plate 6 and extends horizontally forward from the front plate between said flanges, as at 20, so as to provide a slideway for the gate body 16. Said gate body has near its opposite ends bolts 21, 21 projecting upward from its upper edge through holes in the said horizontal portion 20 of the guard 18, and which bolts receive above said horizontal portion 20 nuts 22 by means of which the gate body 16, can be raised and lowered and held at any desired height to determine the depth of coal fed onto the chain grate.

It is necessary to provide means to prevent combustion from being communicated to the fuel in the hopper, and by our invention we accomplish this by the same gate body 16 which controls the depth of fuel. Said gate body is hollow, as stated, and the water chamber thus provided is connected by pipes 23, 24 with a suitable tank or water-supply, not shown, and said body 16, may have a relief valve, also not shown, attached at any convenient place in said body. These pipes lead from the upper edge of the gate body 16 near its opposite end, and extend loosely through openings in the guard 18, being connected at suitable height to horizontal pipes 25, 25 which permit all the up and down movement of the gate which is necessary. The gate thus not only controls the feed of fuel, but also prevents the fuel in the hopper from being ignited.

The said front shaft 12 of the traveling chain grate is journaled at its ends in slidable bearing blocks 26 and 27 which lie outside the housings 11, 11 and have extensions projecting between the edges of said housings and the end plates above them into horizontal slots 20 of the side plates, said extensions being grooved at top and bottom to receive the said edges at the top and bottom of the slots. Any suitable means, as the wedges 29 which we have shown, may be used for forcing said blocks 26 and 27 forward in the slots so as to tighten the chain grate, and hold the blocks where desired. In the drawings, and particularly Fig. 14, holes 30 are shown in the side plates to receive pins over the top edges of the wedges 29 and hold them against working upward. One of said slide blocks, as 26, has formed on itself or carries, a gear case 31 which incloses a worm-wheel 32 fast on the shaft 12, and also provides vertically disposed bearings for a shaft 33 carrying a worm 34 which meshes with said worm wheel 32. Loose upon the upper part of said shaft 33 is a horizontally disposed worm wheel 35 which has fast to itself a clutch member 36 adapted to engage with a coöperating clutch member 37 on the shaft 33. Said lower clutch member 37 is held with respect to the shaft 33 by a transverse pin 38 and by knocking out this pin the clutch member can slide out of engagement with the upper clutch member 36. The shaft 33 can then be turned independent of the worm wheel 35, as for instance when it is desired to rotate the chain grate backward a little for any reason. For doing this we have shown the shaft 33 extending above the worm-wheel 35 and having a wrench-receiving end 39.

The gear-wheel 35 is in a case 40 which projects from the top of the gear case 31 upon a bracket 43 and provides at one side of itself bearings for a shaft 41 carrying a worm 42 in mesh with said worm wheel 35. This shaft 41 is connected by a flexible coupling 44 of any ordinary and well-known type, to the driving shaft 45 of an engine 46, which is mounted upon the top of the gear case 31, said engine having its fly-wheel 47 adjacent to said flexible coupling and said coupling obviating the necessity for nice alinement. The engine which we have shown forms the subject-matter of a separate application for patent, and obviously its detail construction is immaterial to the present invention. Different kinds of engines may be mounted upon the bed or seat provided by the gear case 31 and connected to the shaft 41 by the flexible coupling 44, or an electric motor or other kind of motor can be substituted and similarly connected. The important points are that the motor or engine is located close to the shaft 12 and upon the block 26 in which said shaft has its bearing, so that when said shaft and block are adjusted, as above described, the engine or motor moves with them and its relation thereto is undisturbed. Notwithstanding such close proximity, the necessary reduction of speed and the increase of power is secured by connecting the engine or motor to the shaft 12 by the two worm-and-gears arranged in series, as set forth.

The upper bars or rails 13, 13 at the opposite sides of the stoker are preferably channel beams with their flanges directed inward or toward the traveling grate, and the lower bars or rails 14, 14 are preferably angle-iron with one flange substantially vertical and the other projecting horizontally inward from the lower edge thereof, said beams being shown supported intermediate of their opposite ends by legs 48. Depending from the lower flanges or edges of the upper rails 13, 13, near the rear ends thereof are straps 49, 49 holding the ends of the shaft 50 around which the rear end of the chain grate runs. Said chain grate comprises endless chains 51, 52 at its opposite lateral edges and between which extend the transverse grate bars 53 as will be hereinafter more fully described. The said chains run over propelling or sprocket-wheels 54, 54 upon the front shaft 12, and over large peddler wheels 55 loose on the rear shaft 50 which are simply grooved at their peripheries to receive the chains. Intermediate of the front and rear shafts 12 and 50 peddler rods 56 are bolted at their opposite ends to the lower edges or flanges of the side rails 13, 13 and upon these peddler rods are loosely mounted peripherally grooved peddler wheels 57 which are smaller than the said peddler wheels 55 upon the rear shaft so as to lie between the upper and lower reaches of the chain grates and support the chains of the upper reach. Preferably the first two pairs or so of these peddler wheels from the front of the stoker, as marked 58 in the drawings, are smaller than the peddler wheels 57 which are farther back, so that the chain grate as it passes beneath the fuel inlet curves downward somewhat or is concaved at that point, which causes the intermeshing fingers of the grate bars to close more tightly together and thus prevent the fine particles of fuel from dropping down through the grate before they have time to ignite.

The lower reach of the chain grate returns to the front of the stoker over rollers 59 loosely mounted upon cross rods 60 which are bolted at their opposite ends to the lower edges or flanges of the lower side rails 14, 14. These support the lower horizontal portion of the chain grate, and at the front and rear downwardly curving ends of the chain grate are similarly curved guides upon which the grate bars slide in passing from the plane of the upper reach to the plane of the lower reach and vice versa. It will be understood that in case of breakage of a grate bar or its detachment from the chains, said bar can escape from its place only in rounding the end turns where the bars separate. The said guides are to prevent such escape of a broken bar, whereby it would drop down into the ash pit, and to cause it to be brought around to the front of the stoker, where it can be conveniently removed.

Figure 1:
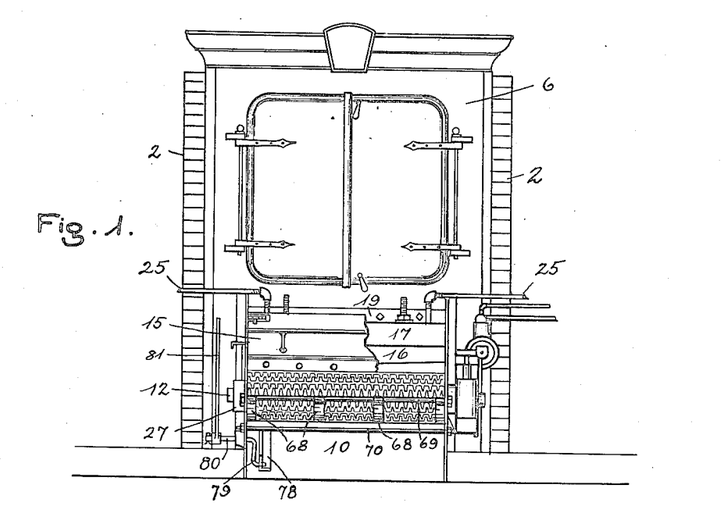
Figure 1 is a front elevation of a boiler furnace equipped with our improved chain grate stoker.
Figure 2:
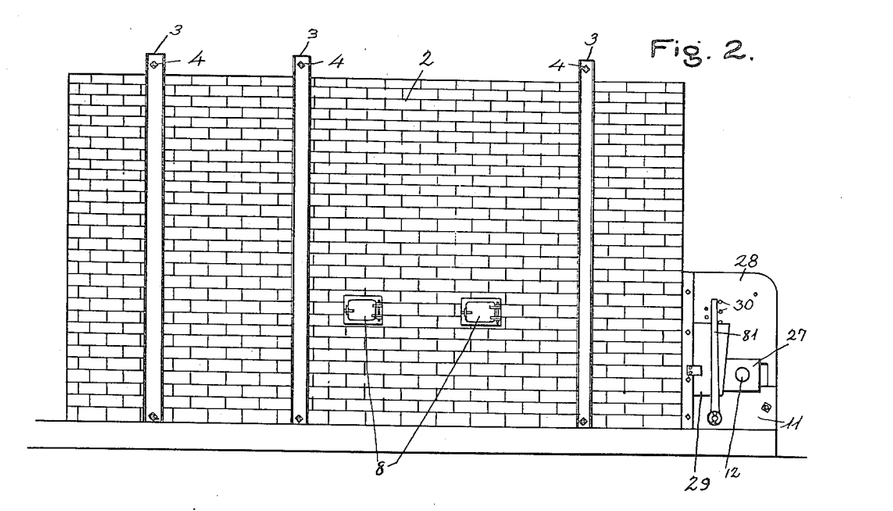
Fig. 2 is a side elevation of the same.
Figure 3:
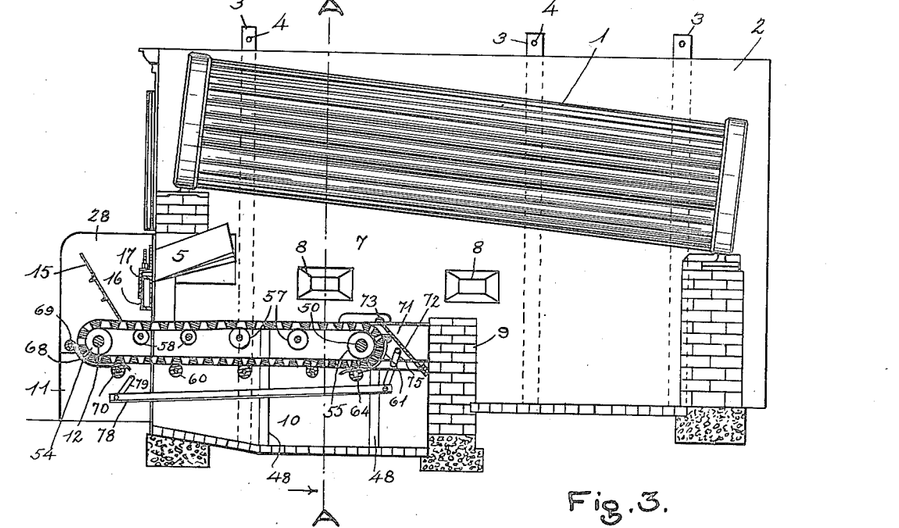
Fig. 3 is a vertical central longitudinal section of the furnace and stoker.
Figure 4:
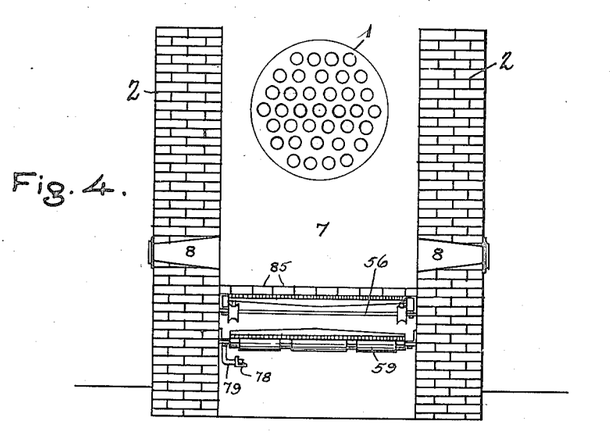
Fig. 4 is a vertical transverse section on line A—A, Fig. 3.
Figure 5:
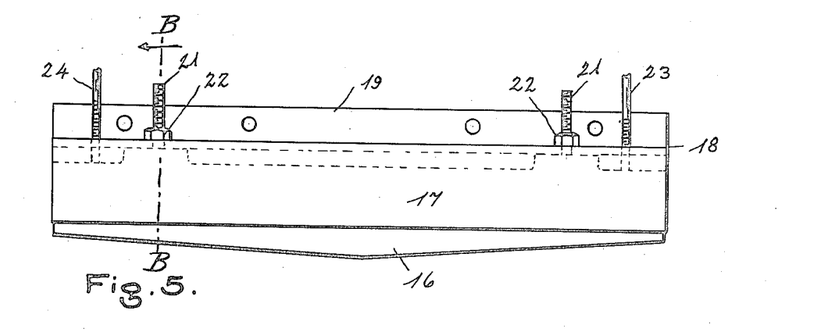
Fig. 5 is a front view of a certain water-cooled fuel feed control, detached from the rest of the stoker.
Figures 6, 7:
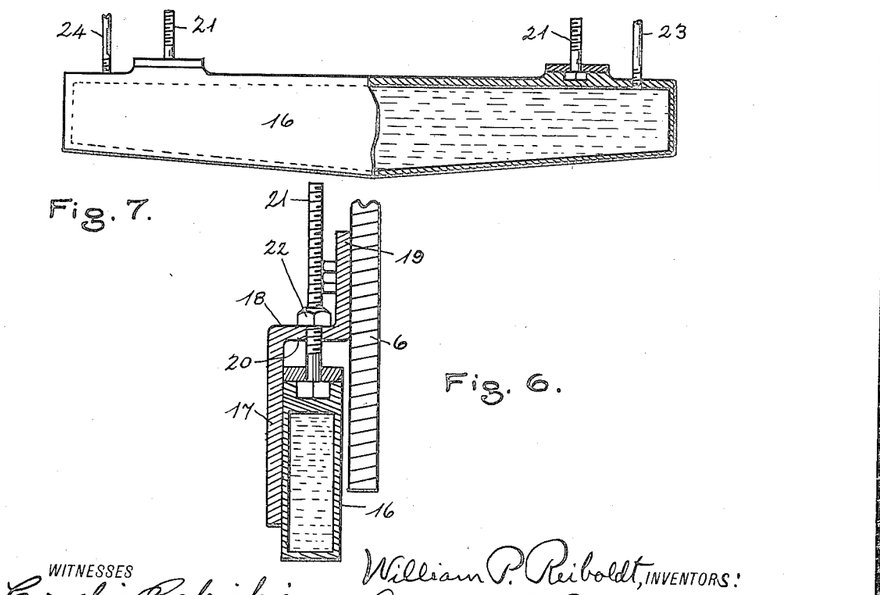
Fig. 6 is a transverse section of the same on line B—B, Fig. 5, showing also the front plate of the boiler to which it is attached.
Fig. 7 is a front view of the water-filled gate of the feed-control, partly in section.
Figure 8:
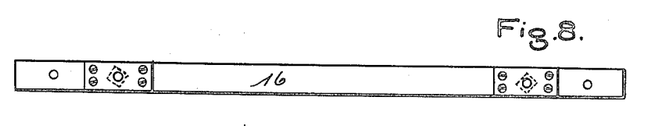
Fig. 8 is a top edge view of the same.
Figure 9:
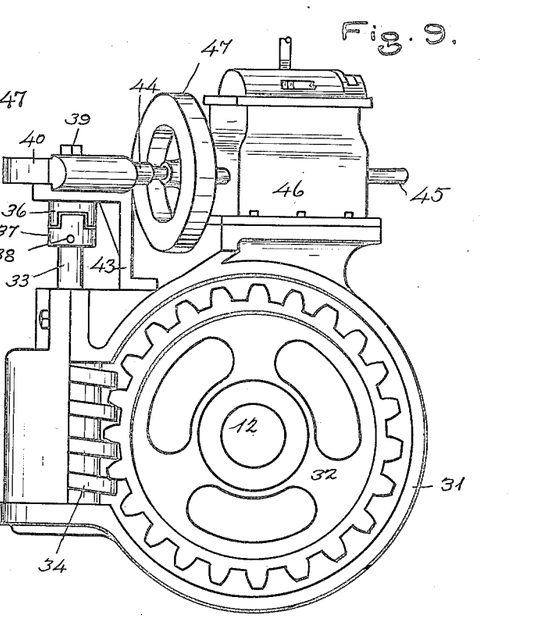
Fig. 9 is a side view of the driving means employed for causing the chain grate to travel.
Figure 10:
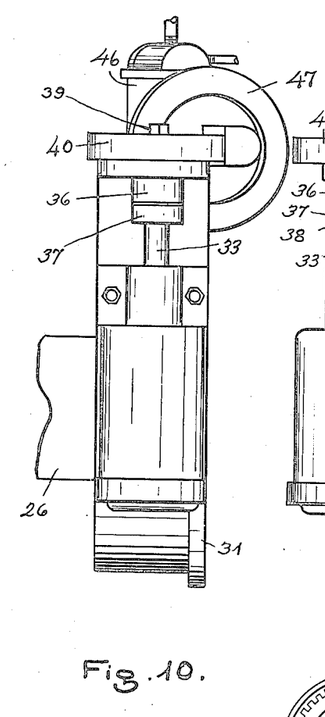
Fig. 10 is a view of the same from the front of the stoker.
Figure 11:
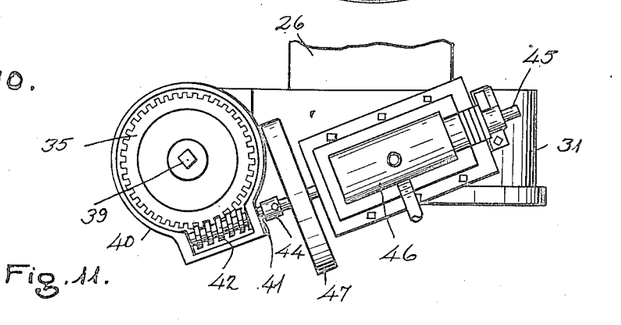
Fig. 11 is a plan view.
Figures 12, 13, 14:
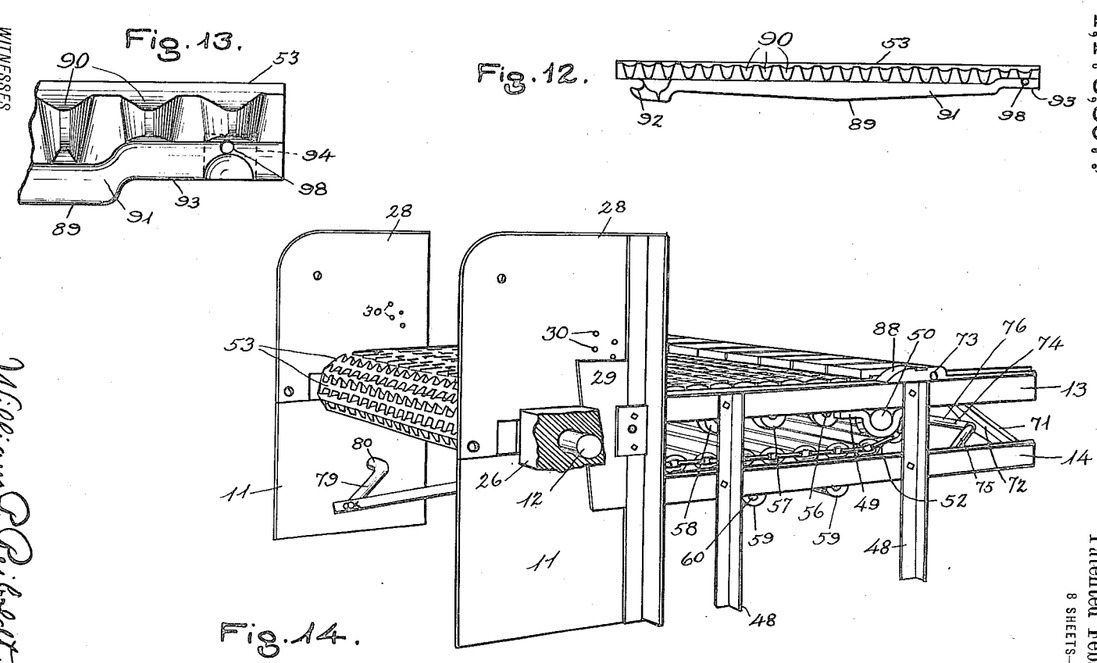
Fig. 12 is a side view of one of the grate bars.
Fig. 13 is a detail side view of one end thereof.
Fig. 14 is a perspective view of the stoker without the fuel feeding and the driving means, detached from a furnace.
Figure 15:
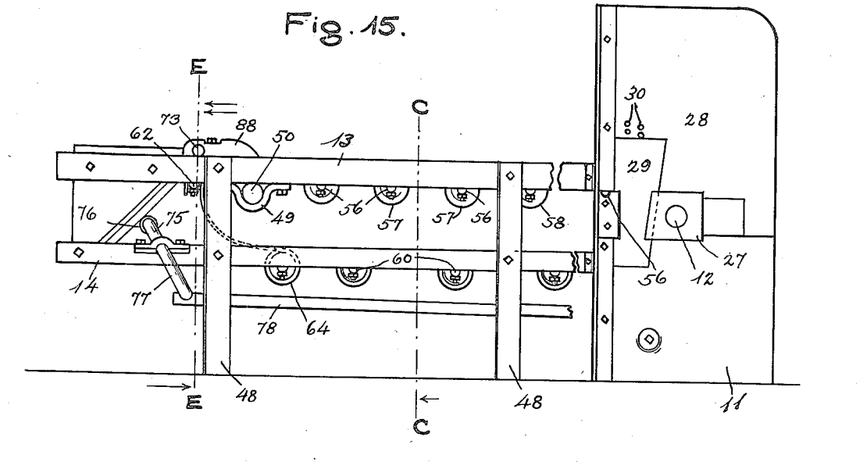
Fig. 15 is a side elevation of the stoker as shown in Fig. 14, broken at the middle.
Figure 16:
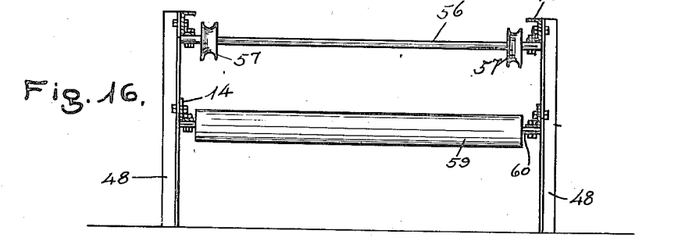
Fig. 16 is a vertical transverse section on line C—C of Fig. 15.
Figure 17:
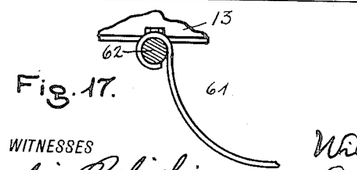
Fig. 17 is a detail section on line D—D, Fig. 20, illustrating the connection of certain guides to their cross-bar.

Upon the upper and lower substantially plane and parallel runs of the grate the fingers of the bars intermesh so as to hold any one in place even though it become broken or detached from a chain, but it will be understood that rounding the curved end of the grate causes the bars to separate enough so that their fingers are entirely out of engagement, see Figs. 1 and 14 of the drawings. The guides described therefore extend only around such curved ends of the grate, or from the outermost point of the end of the grate under its curvature to the substantially plane lower run, so as to prevent down-dropping of a broken bar. The said guides are formed of heavy strap iron, and any desired number of them may be employed transversely of the stoker. We have shown four in the drawings, one near each of the side edges of the chain grate and two intermediate ones. The rear guides 61 have their upper ends bent around a cross bar 62 which is bolted to the upper rails 13, 13, and are held in proper spaced relation by lengths of pipe 63 slipped upon said rod or bar 62. The lower ends of said guides 61 rest upon the rear roller 64 mounted between the lower rails 14, 14, said roller being peripherally grooved at proper intervals, as at 65, to receive said guides below its grate-supporting surface. Preferably said grooves are formed by roller sections 66 and 67 of different diameters. The front guides 68 are similar to the rear guides and similarly supported at their upper ends upon a cross rod 69, resting at their rear ends upon the first roller 70 between the lower rails 14, 14 and which is similar in construction to the rollers 64 just described. The said rod 69 for the front guides, is preferably lower than the corresponding cross-bar 62 for the rear guides, as shown, so as to allow room for a broken grate bar to be taken out.

Figure 18:
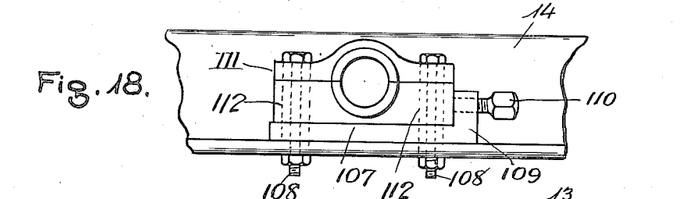
Fig. 18 is a detail side view of one of the bearings for the rod which swings the dump plate.
Figure 19:
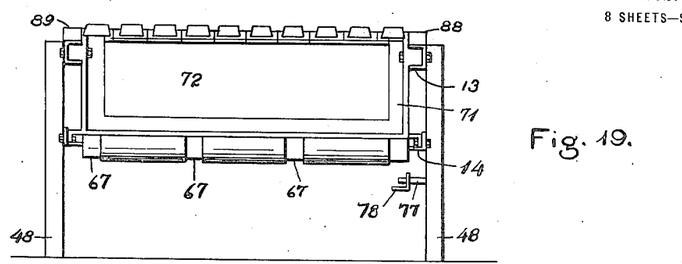
Fig. 19 is a rear elevation of the stoker.
Figure 20:
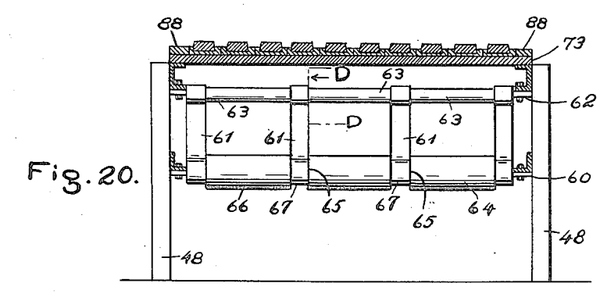
Fig. 20 is a transverse sectional view on line E—E Fig. 15, looking toward the front of the stoker, as indicated by the single arrow.
Figure 21:
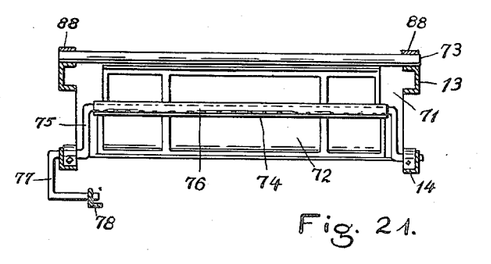
Fig. 21 is a view also on line E—E, Fig. 15, looking toward the rear of the stoker, as indicated by the double arrow, the bridge bars being omitted.
Figure 22:
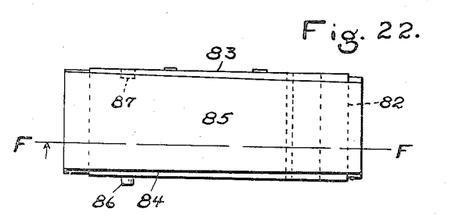
Fig. 22 is a plan of one of the bridge bars at the rear end of the grate for receiving the ashes therefrom.

Between the rear ends of the side rails 13, 14 is arranged a transverse inclined frame 71 having a large opening adapted to be closed by a dump plate 72 which receives the ashes and refuse from the rear end of the grate. Said frame 71 is supported at its ends by being bolted to the side rails 13, 14 and its lower rear edge is against the bridge wall 9, the frame lying in a plane which inclines forwardly upward at about 45°. The upper edge of said frame is open and occupied by the upper edge of the dump plate 72 which is pivoted by trunnions 73, 73 at the opposite ends of said edge. Said dump plate is adapted to close rearwardly upward against the frame 71, and is swung by means of a transverse rod 74 journaled upon the lower rails 14, 14 below and forward of said dump plate and having a laterally bent eccentric portion 75 between said rails which carries a loose sleeve 76 adapted to engage the dump plate and swing the same as the rod is turned in its bearings. One end of the rod is bent downward outside the side rails 14 to form a crank arm 77, and from said crank arm a connecting rod 78 extends forward through the upper part of the ash pit, adjacent to one side thereof, to the inner side of the housing 11 where it connects to the crank arm 79 of a short shaft 80. projecting out through said housing 11 and having an angular end to receive a wrench or rocking lever 81. The dump plate 72 is ordinarily closed to prevent draft at this point, but at intervals it is lowered to dump the ashes which have accumulated on it. Since it is desirable to close the dump plate tight and avoid loss of draft, the said rod 74 is preferably mounted on the side rails 14, 14 in adjustable bearings, such for example as shown in Fig. 18. Here 107 indicates a base portion held stationary on the horizontal flange of the side rail 14 by the bolts 108, 108 and having at its end away from the dump plate a wall 109 through which works a screw 110 engaging the journal box proper, 111. This journal box proper has longitudinal slots 112, 112 to receive the bolts 108, 108, and thus by loosening said bolts the journal box can be adjusted toward and away from the dump plate to cause the eccentric portion 75 of the rod 74 to properly engage the dump plate 62 to close the same tightly. Obviously by this means the dump plate can be kept impervious to draft, and yet the ashes and refuse from the grate can be at all times quickly and easily dumped. The efficiency of the grate depends in a large measure upon preventing draft around the same, which lessens the combustion, and therefore it is of highest importance to secure a tight closure of the dump plate.

Figure 23:
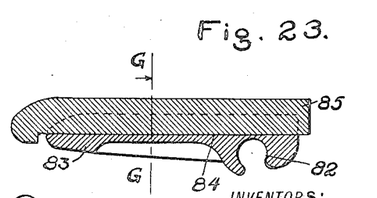
Fig. 23 is a longitudinal section of the same on line F—F of Fig. 22.
Figure 24:
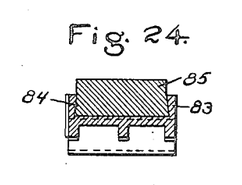
Fig. 24 is a transverse section of the bridge bars on line G—G of Fig. 23.
Figure 25:
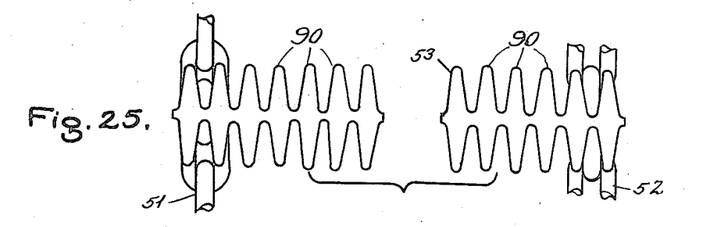
Fig. 25 is a plan of a single grate bar, broken at its middle, and showing only portions of the chains.
Figure 26:
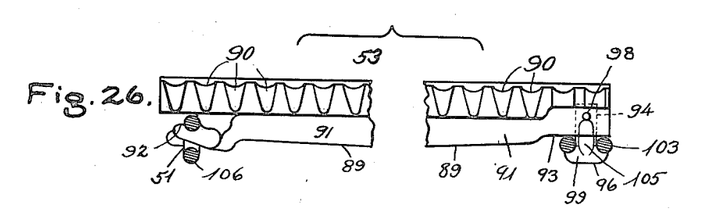
Fig. 26 is a side elevation of the same, with the chains in cross-section directly beneath the bar.
Figure 27:
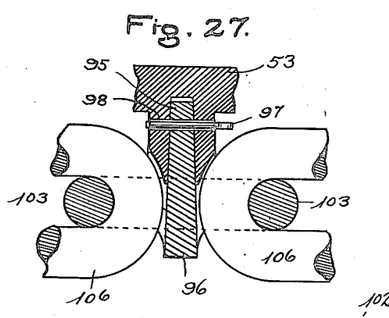
Fig. 27 is a cross section of the bar at its attachment to a flatwise link of a chain.
Figure 28:
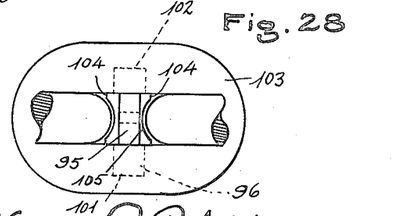
Fig. 28 is a plan of a flatwise link of a chain with the fastening shoe therein, the grate bar being removed.
Figure 29:
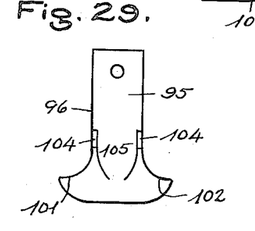
Fig. 29 is a side elevation of a fastening shoe looking in the direction of the length of the chain.

The ashes and refuse from the rear end of the chain grate pass over a transverse series of bridge bars which rest at their forward free ends upon the said grate and are pivoted or hinged at their rear ends upon the upper edge of the dump plate. Said upper edge of the dump plate is rounded in alinement with the trunnions 73, and each of the bridge bars has at its under side and near its rear end a transverse groove 82 which is in cross section curved upon an arc of a circle greater than a semi-circle, as shown in Fig. 23, the narrow mouth of said groove being adapted to receive a thinned portion of the pivotal rib or upper edge of the dump plate and allow the bridge bar to drop into place, after which it can be slid longitudinally into connected pivotal relation to the rib, at the same time being held in locked relation thereto.

Each of the bridge bars has its body 83 channeled longitudinally of its top, the channel 84 thus formed having undercut side walls and converging toward the rear or pivotal end of the bridge bar. A correspondingly-shaped fire brick 85 is seated in said channel and extends above the walls thereof as well as beyond the front and the rear ends of the body 83. All tendency of the grate and material carried rearward thereon is to force the said fire-brick 85 rearward and thus hold them firmly seated in the bridge bar bodies 83. Said fire brick prevents the hot ashes and clinkers from coming in contact with the metal bodies so as to melt them or weld them together, and especially the forward ends of the fire-bricks which project beyond the ends of the bodies, keep the hot material away from said ends and hold collected against themselves a more or less permanent bank of ashes which have cooled and thus aid in protecting the metal body portions of the bridge bars. Each bridge bar has upon one side of its body 83, a small projection 86 adapted to enter a corresponding recess 87 in the next bridge bar, and in its opposite side a similar recess 87 to receive the projection 86 of the other adjacent bridge bar. This causes the entire series of bars to form a longitudinally flexible bridge for the ashes to pass over, any single bar of which can rise slightly independent of the others to allow the passage of a slight obstruction or unevenness. Preferably, the trunnions 73 of the dump plate are journaled in blocks 88 secured upon the upper edges of the upper rails 13, 13 in transverse alinement with the bridge bars and shaped so as to conform in contour thereto, so that there will be a uniform bridge from side to side of the stoker.

The chain grate itself consists of endless parallel chains 51, 52, running over the driving wheels 54, on the front shaft 12 and large peddler wheels 55 on the rear shaft 50, the grate bars 53 extending transversely from chain to chain. One of these bars is shown in Fig. 12 and it consists of laterally projecting fingers 90 at the upper part and a vertical rib 91 at the bottom, said rib preferably tapering at its lower edge 84 from each end toward the middle so as to be deepest there. While the grate bar shown in the drawings is the preferred form, it will of course be understood that the arrangement of the fingers on said bar may be varied, that is, they may be staggered or they may be on but one side of the bar. At one end the bar has a hook 92, to engage a vertical or edgewise link of one chain, and at the other end the rib 91 is cut away as at 93, to the proper depth to secure desired height of the bar face, and has a recess or socket 94 extending toward the said face and in the plane of the rib, see Fig. 13. This end of the grate bar rests upon a horizontal or flatwise link of the chain, and said socket receives the shank 95 of a fastening shoe, as shown in Figs. 25–29, inclusive. Said shoe 96 extends through the flatwise link, between the ends of the two adjacent edgewise links, and has a head at the side of the chain away from the grate bar, a shaft projecting from said head being held in place in the socket 94, in the end of the grate bar, by means of a cotter pin 97 passed through a hole 98 near one end of the grate bar.

The aforesaid shoe resembles to a certain extent an inverted T. The head 99 thereof provides at opposite sides of the shank 95, or toward the opposite side of the chain, shoulders 101, 102 for the flatwise link 103 to rest upon, and at each of its other two opposite sides, or sides facing lengthwise of the chain, protruding flanges 104 form concave cheeks 105, 105 into which seat the adjacent vertical links 106 of said chain.

Although we have provided a direct drive to actuate the chain grate it will be obvious that, were several of our stokers working in a row, the direct drive might be omitted in their construction and they could be driven in series from a shaft with ratchets, as is common. Further modifications may be made in the construction which we have shown to illustrate our invention without departing from the spirit and scope of the invention, and we do not wish to be understood as limiting ourselves except as the state of the art may require.

Having thus described the invention, what we claim is:

1. In a chain grate stoker, the combination of a traveling grate, a drive shaft for said grate, adjustable blocks having bearings for said shaft, an engine or motor on one of said blocks, and means for connecting said engine or motor to said shaft to drive the same, whereby said blocks may be adjusted without affecting the connection of the engine or motor to the shaft.

2. In a chain grate stoker, the combination of a traveling grate, a drive shaft for said grate, an adjustable bearing block for said shaft, a worm wheel on said shaft, a worm engaging said worm wheel, a shaft for said worm having bearings in said block, a worm wheel on said worm shaft, a second worm meshing with said last-mentioned worm wheel, an engine or motor mounted on said block, a flexible coupling connecting the shaft with said engine or motor to said second worm, and means for adjusting said bearing block.

3. In a chain grate stoker, the combination of a traveling grate, a drive shaft for said grate, an adjustable bearing block for said shaft, a worm wheel for said shaft, a worm engaging said worm wheel, a shaft for said worm having bearings on said block, and having a wrench-receiving portion, a releasable clutch member on said shaft, a worm wheel loose on said worm shaft, a clutch member fixed on said worm wheel and adapted to engage the clutch member on the worm shaft, a second worm engaging said second worm wheel, an engine or motor on the bearing block adapted to drive said second worm, and means for adjusting said bearing block.

4. In a chain grate stoker, the combination of a traveling grate, a drive shaft for said grate, adjustable blocks having bearings for said shaft, an engine or motor movably mounted on one of said blocks, and means for connecting said engine or motor to said shaft to drive the same.

5. In a chain grate stoker, the combination of a traveling grate, a drive shaft for said grate, adjustable blocks having bearings for said shaft, one of said blocks providing a gear case having at its top a bed or seat, an engine or motor secured on said bed or seat, and means for connecting said engine or motor to said shaft to drive the same.

6. In a chain grate stoker, the combination of a traveling grate, a drive shaft for said grate, adjustable blocks having bearings for said shaft, one of said blocks providing a gear case having at its top a bed or seat and at its side alined journal bearings, a worm wheel on said shaft in said gear case, a worm engaging said worm wheel and having a shaft in said journal bearings of the gear case, an engine or motor secured on said bed or seat of the gear case, and means for connecting said engine or motor to said worm shaft.

7. In a chain grate stoker, the combination of a traveling grate, a drive shaft for said grate, an adjustable bearing block for said shaft providing a gear case with a bed or seat at its top, a worm wheel on said drive shaft in said gear case, a worm engaging said worm wheel and having a shaft projecting upward, an engine or motor secured on the bed or seat at the top of said gear case, a clutch member rotatably fast on said worm shaft, a coöperating clutch member loose on said worm shaft, and means for connecting said loose clutch member to the engine or motor to drive the same.

8. In a chain grate stoker, the combination of a traveling grate, a drive shaft for said grate, an adjustable bearing block for said shaft providing a gear case with a bed or seat at its top, a worm wheel on said drive shaft in said gear case, a worm engaging said worm wheel and having a shaft projecting upward, an engine or motor secured on the bed or seat at the top of said gear case, a lower clutch member rotatably fast on said worm shaft, means for releasably holding said clutch member against longitudinal movement, an upper clutch member loose on said worm shaft, means for driving said loose clutch member from the engine or motor, and means for turning the worm shaft when said clutch members are disengaged.

9. In a chain grate stoker, the combination of a traveling grate, a drive shaft for said grate, an adjustable bearing block for said shaft providing a gear case having at its top a bed or seat and at its side upright shaft bearings, a worm wheel on said drive shaft in said gear case, a worm engaging said wheel, a shaft for said worm journaled in said bearings of the gear case, a worm wheel on the upper end of said shaft, a casing for said worm wheel mounted upon the gear case and providing shaft bearings at one side of itself, a worm for said upper worm wheel, a shaft for said worm journaled in said bearings of the casing, and an engine or motor on said bed or seat of the gear case adapted to drive said last-mentioned shaft.

10. In a chain grate stoker, the combination of a traveling chain grate, a dump plate at the end of said chain grate and bridge bars hinged at the upper edge of said dump plate and lying on the chain grate, each bridge bar comprising a body having a longitudinal channel or seat and sides therefor which converge rearwardly, and a fire brick mounted in said channel or seat, said fire brick fitting said channel or seat so as to wedge therein when inserted at its front end.

11. In a chain grate stoker, the combination of a traveling chain grate, a dump plate at the end of said chain grate, and bridge bars each comprising a body portion hinged at the upper edge of said dump plate and having at its upper part, a forwardly open seat with walls adapted to prevent lateral or upward or rearward escape, and a fire-brick fitted in said channel of the body portion and adapted to extend over the chain grate adjacent to the surface thereof.

12. In a chain grate stoker, the combination of a traveling chain grate, a dump plate at the end of said chain grate and bridge bars each comprising a body portion hinged at the upper edge of said dump plate and having at its upper part a channel with undercut side walls which converge rearwardly, and a fire brick fitted in said channel of the body portion and adapted to extend over the chain grate adjacent to the surface thereof.

13. In a chain grate stoker, the combination with a traveling chain grate, of bridge bars arranged longitudinally of the chain grate with their ends overlying the same, each bridge bar comprising a body having a longitudinal channel or seat open at the end of the bridge bar next the chain grate and having walls adapted to prevent escape in any other direction, a fire brick mounted in said channel or seat of each bridge bar and means for supporting the other ends of said bridge bars.

14. In a chain grate stoker, the combination with a traveling chain grate, of bridge bars arranged longitudinally of the chain grate with their ends overlying the same, each bridge bar comprising a body having a longitudinal channel or seat and under-cut side walls which converge away from the chain grate, a fire brick mounted in said channel or seat of each bridge bar, and means for supporting the other ends of said bridge bars.

15. In a chain grate stoker, the combination with a traveling grate, a front plate above said grate spaced therefrom, a hopper on said front plate, a guard on said front plate inside said hopper and forming with the front plate a closed vertical slideway extending substantially the length of the hopper, a hollow gate in said slideway, water inlet and outlet pipes extending upward from said hollow gate loosely through said guard and having thereabove portions adapted to allow up and down movement of the gate, and means for adjusting said gate vertically.

16. In a chain grate stoker, the combination of a traveling grate, a front plate above said grate spaced therefrom at its lower edge, a hopper on said front plate, a guard on said front plate in said hopper comprising an upper flange secured to said front plate, a lower flange at a distance from said front plate and an intermediate portion projecting from the front plate between said flanges, a gate between said lower flange and front plate, fixed bolts extending from said gate loosely through the portion of said guard between its flanges, and nuts on said bolts above the guard.

17. In a chain grate stoker, the combination of a traveling grate, front and rear end shafts for said grate, driving wheels upon the front shaft, peddler wheels upon the rear shaft, intermediate peddler wheels in alinement with said end wheels, the intermediate wheels adjacent to the driving wheels being lower at their grate bearing surfaces than said end wheels and the other intermediate wheels, means for supporting all said wheels, means for turning the shaft carrying the drive wheels, and means for feeding fuel upon the chain grate above said lower peddler wheels.

18. In a chain grate stoker, the combination with front and rear shafts, wheels on said shafts, substantially parallel endless chains extending around said wheels, grate bars arranged transversely of said chains and secured to the links thereof, said grate bars having fingers which intermesh when the chains are substantially straight, and means for supporting the upper and lower runs of the chain grate in substantial planes tangent to the upper and lower edges of the said wheels, of curved guides substantially concentric with one of the shafts and extending longitudinally of the grate outside the same contiguous to its curved end, whereby any bar which is detached from a chain is held against falling away therefrom while its fingers separate from the adjacent bars in rounding the curve.

19. In a chain grate stoker, the combination with front and rear shafts, wheels on said shafts, substantially parallel endless chains extending around said wheels, grate bars arranged transversely of said chains and secured to the links thereof, said grate bars having fingers which intermesh when the chains are substantially straight, and means for supporting the upper and lower runs of the chain grate in substantial planes tangent to the upper and lower edges of the said wheels, of curved guides substantially concentric with the rear shaft and extending longitudinally of the grate outside the same contiguous to its curved end from the rearmost part thereof to the lower substantially plane run, whereby a bar becoming detached from a chain during its passage of the upper run is held against falling away from the chains while its fingers separate from the adjacent bars in rounding the curved rear end.

20. In a chain grate stoker, the combination of endless chains with grate bars arranged transversely outside the same, front and rear shafts, wheels on said shafts for the chains of said grate, a bar parallel to one of said shafts at substantially the same height therewith and outside the chain grate contiguous to its outer surface, a second bar parallel to the first-mentioned one and beneath the chain grate adjacent its outer surface, rollers on said last-mentioned bar engaging the chain grate, and curved guides supported at one end on the first-mentioned bar and at their other ends on the second-mentioned bar between the said rollers, said guides lying contiguous to the outer surface of the chain grate.

WILLIAM P. REIBOLDT.
EDWARD C. CLARK.

Witnesses for William P. Reiboldt:
CHAS. E. BIRCH,
CORNELIUS ZABRISKIE.

Witnesses for Edward C. Clark:
CORNELIUS ZABRISKIE,
FRANCES E. BLODGETT.